US007170021B2

(12) United States Patent
Sorenson

(10) Patent No.: US 7,170,021 B2
(45) Date of Patent: Jan. 30, 2007

(54) ELECTRICAL SWITCH ROCKER AND ASSEMBLY

(75) Inventor: Richard Sorenson, Stuart, FL (US)

(73) Assignee: Carling Technologies, Inc., Plainville, CT (US)

( * ) Notice: Subject to any disclaimer, the term of this patent is extended or adjusted under 35 U.S.C. 154(b) by 0 days.

(21) Appl. No.: 11/249,827

(22) Filed: Oct. 13, 2005

(65) Prior Publication Data

US 2006/0081454 A1 Apr. 20, 2006

Related U.S. Application Data

(60) Provisional application No. 60/618,790, filed on Oct. 14, 2004.

(51) Int. Cl.
*H01M 13/00* (2006.01)
*H01M 3/00* (2006.01)

(52) U.S. Cl. ...................... 200/339; 200/310; 200/315; 200/333

(58) Field of Classification Search ................ 200/310, 200/315, 333, 339
See application file for complete search history.

(56) References Cited

U.S. PATENT DOCUMENTS 3,996,441 A * 12/1976 Ohashi ....................... 200/309
5,105,059 A * 4/1992 Sorenson et al. ........ 200/302.3
6,861,606 B2 * 3/2005 Ribeiro et al. .............. 200/552
2001/0019013 A1 * 9/2001 Weber et al. ............... 200/309

* cited by examiner

*Primary Examiner*—Elvin Enad
*Assistant Examiner*—Lheiren Mae A. Anglo
(74) *Attorney, Agent, or Firm*—McCormick Paulding & Huber LLP

(57) ABSTRACT

A rocker switch assembly has several rocker shells that define cavities to receive inserts of several varieties that allow the user to provide several rockers in a side-by-side assembly of rocker switches with a wave pattern that allows each switch to be easily identified as to function and/or indicates switch condition. Reversing the orientation of every other rocker shell provides the wave pattern, and the use of different inserts allows variation in the illumination level of individual rocker switches, yet each rocker shell shares a common geometry.

6 Claims, 3 Drawing Sheets

ELECTRICAL SWITCH ROCKER AND ASSEMBLY

CROSS-REFERENCE TO RELATED APPLICATIONS

This application claims priority from an earlier Provisional Application bearing the same title and filed Oct. 14, 2004 under Ser. No. 60/618,790. That earlier application is summarized herein, and is incorporated herein by reference.

BACKGROUND

This invention relates generally to a rocker configuration for an electrical switch having a movable actuator provided within the switch case, the actuator having a portion projecting through an opening provided centrally of the bracket portion of the switch housing to receive a rocker of the type having a depending spike or post that can be assembled with the actuator to provide electrical switches of different external geometry and configuration on a standardized rocker switch housing. U.S. Pat. No. 5,105,059 issued in April of 1992 to Sorenson et al. illustrates such a switch housing construction. The present invention relates to a unique rocker for use in such a switch housing, the rocker being fitted with internal laterally spaced ribs that are adapted to be received on shoulders defined in the switch bracket of the above-mentioned '059 patent disclosure so as to provide a rugged pivotal arrangement for the rocker as suggested in that prior art patent.

SUMMARY OF INVENTION

The rocker of the present invention is intended for use in an electrical switch housing to selectively open and close switch contacts provided within the housing, the rocker being of generally rectangular configuration and injection molded from a polymeric material. The rocker includes a shell having a convex top surface and depending side and end walls of sufficient depth and shape so as to allow pivotal motion of the rocker about a pivot axis fixed in the case, or bracket of the housing, and that is spaced below a medial portion of the convex top surface of the rocker.

In accordance with the present invention the shell insert 20 is adapted to be received in the cavity 10*a*, and depending tangs 20*e*, 20*e* are adapted to be received in complementary openings 10*e*, 10*e* provided for this purpose in the rocker shell.

Figure 3:
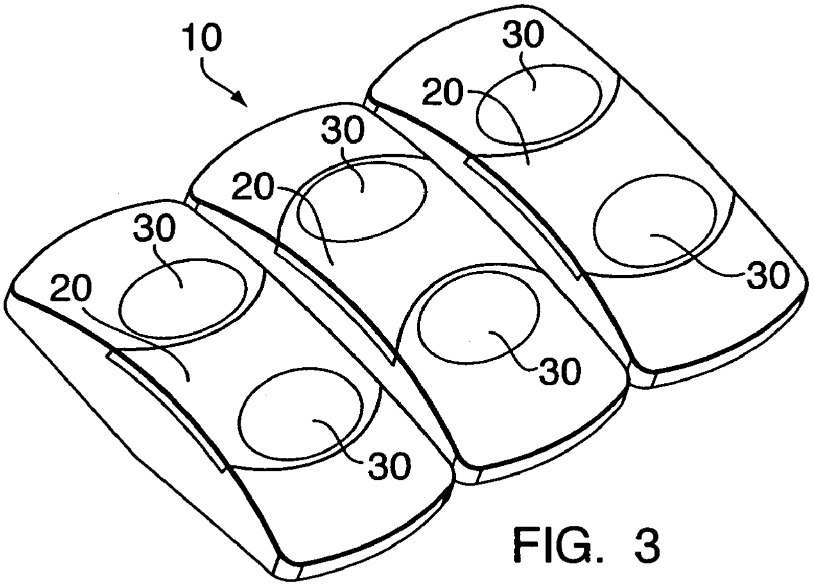
Figure 4:
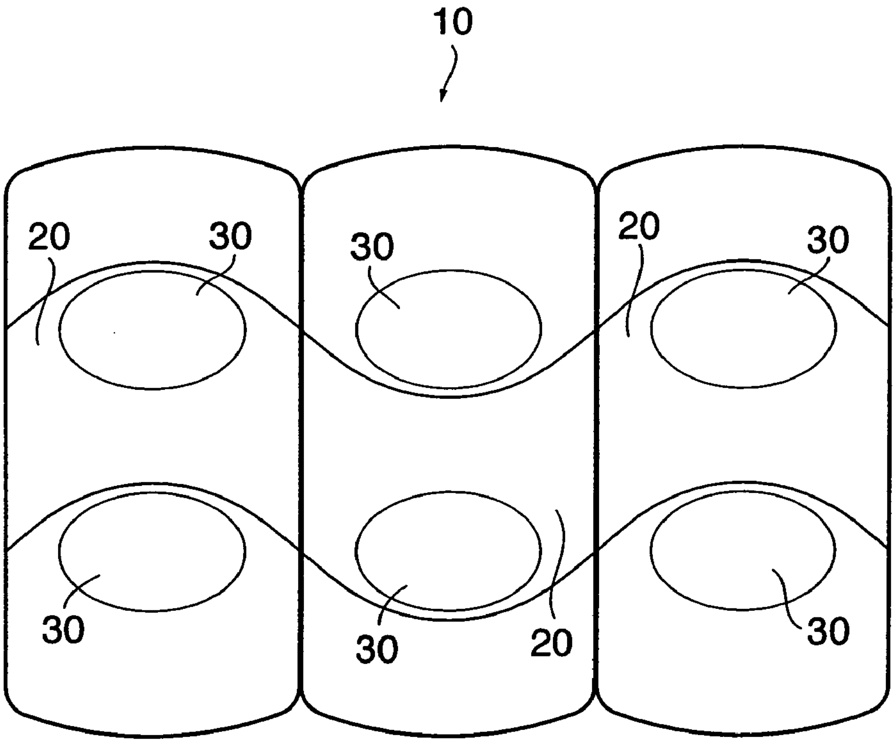
Figure 5:
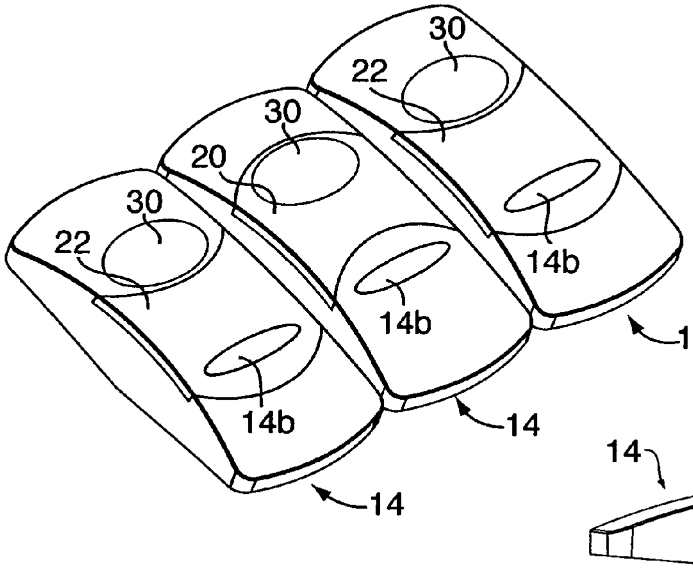

An important feature of the present invention lies in the shape for the insert 20, the insert having parallel sides that complement the sides of the rocker shell. The sides are intended to create a saddle shape for the rocker actuator and are illustrated in FIGS. 3, 4 and FIG. 5. The insert end wall 20*a* fits into the rocker cavity wall 10*a*.

The preferred shape for the insert 20 is then defined by generally parallel convex and concave ends for the shell insert. When alternate rocker shells are reversed in orientation, to provide an array of electrical switches as suggested in FIGS. 3, 4 and 5 for example, a pattern can be produced in the resulting switch assembly.

The array of rocker shells illustrated in FIGS. 3 and in 4 show the result of reversing the orientation of every other of these rockers to create a wave shaped pattern for the inserts 20, 20, and it is a feature of the present invention that the inserts themselves have a textured or colored surface designed to contrast with that of the top surface of the rocker shell itself.

Figure 6:
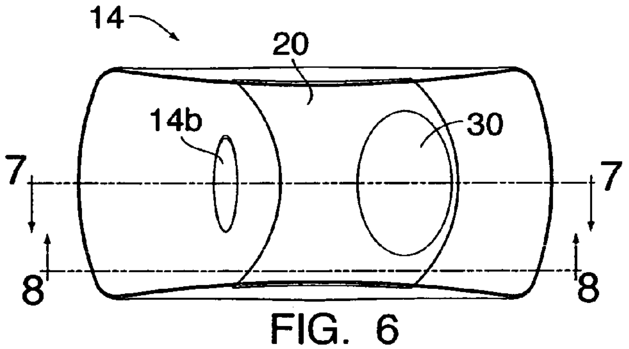

FIG. 6 illustrates the rocker shell 14 with the narrow or reduced area lens 14*b*, but with the same insert 20 as provided in the rocker shell 10 described previously. Thus, the upwardly open cavity 14*a* defined in the top surface of the rocker shell 14 is of identical shape and configuration to that described previously with reference to the cavity 10*a* and rocker shell 10.

Figure 7:
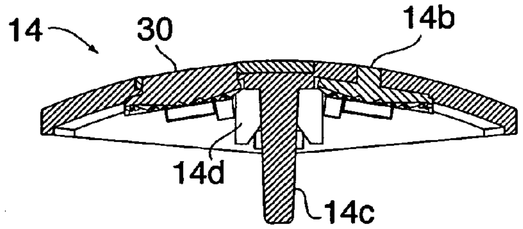

FIG. 7 is a sectional view taken generally on the line 7,7 of FIG. 6 and illustrates the relationship between the depending stud 14*d* and the pivot defining abutments 14*c* provided to cooperate with the shoulders (not shown) in the bracket of the switch housing (see the above-mentioned prior patent, U.S. Pat. No. 5,105,059).

Figure 8:
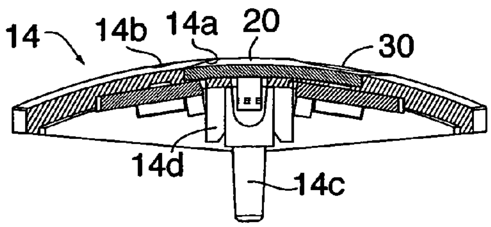

FIG. 8 is a sectional view take on the lines 8—8 of FIG. 6.

Figure 9:
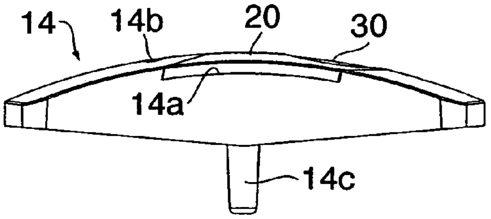

FIG. 9 is a side elevational view of the rocker shown in FIGS. 6, 7 and 8.

Figure 10:
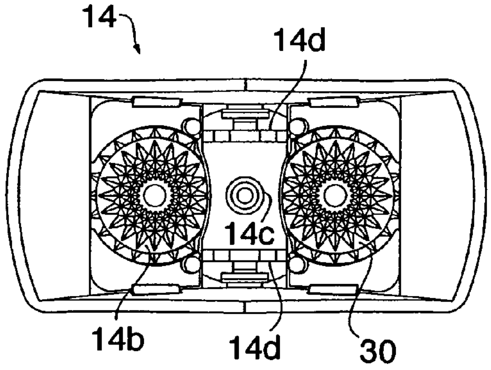

FIG. 10 shows a view of the underside of the rocker shell 14. The shell 10 has an underside of similar configuration. Note that the lenses 30, 30 can be similar to those described previously, and the same resilient tab and slot interlocking arrangement is provided for assembling the lenses in the underside of the rocker shell 14 of FIG. 10. The depending post 14*d* is of identical geometry to that for the rocker shell 10, and the side and end walls are similarly arranged as well.

Figure 11:
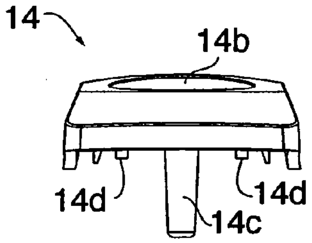

FIG. 11 is an end elevation view of the rocker shell shown in FIG. 9.

Figure 1:
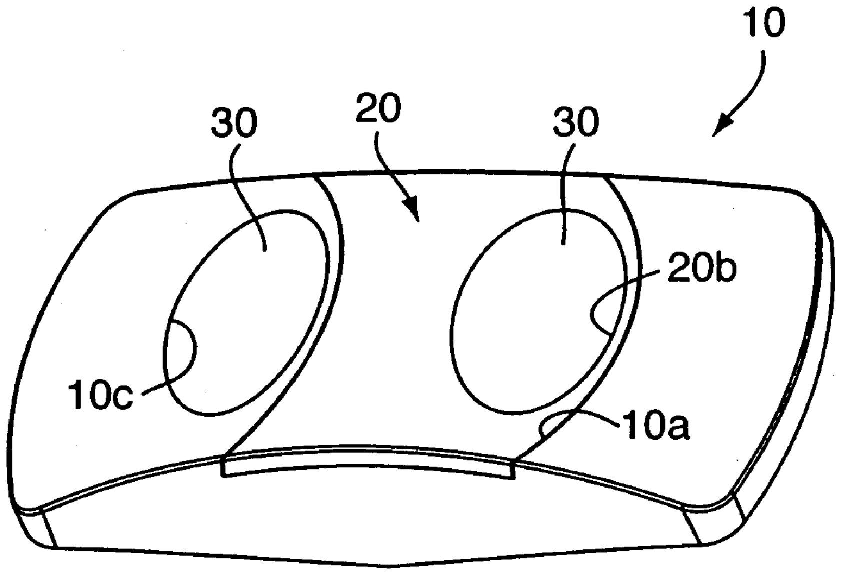
FIG. 1 shows an electrical rocker switch assembled from the components of FIG. 2. The pivot axis 12 can be seen with reference to FIG. 2, and is defined in the switch bracket (not shown). The rocker shell top surface defines an upwardly open cavity in the medial portion thereof, as indicated generally at 10*a*. The shell 10 further includes oval shaped openings 10*b* and 10*c*, one of which 10*b* is defined in the cavity 10*a*. Lenses, 30,30 are adapted to be received in these openings 10*b* and 10*c*, and projecting portions 30*a* of these lenses are adapted to be received in slots provided for this purpose in the underside of the rocker shell for this purpose.
Figure 2:
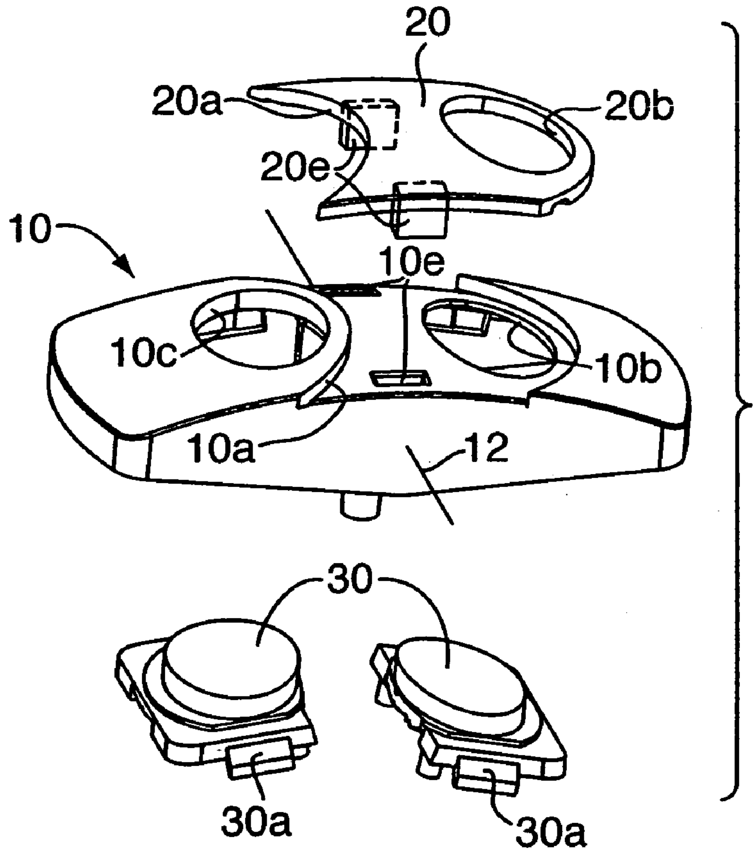

FIG. 5 is an alternative embodiment of the present invention in that the inserts 22, 22 are of different geometry than those described previously with reference to FIG. 1–4. Note that a smaller oval shaped lens projects through these inserts 22, 22 associated with the rocker shells 10, 10. However, the rocker shell 14 is fitted with an insert 20 similar to that shown and described with reference to FIGS. 1 and 2. As a result, the wave shaped configuration presented to the operator of the switches creates a unique and distinctive appearance for the assembly. This can be accomplished with a minimum number of parts and components, and these components can be intermixed or interchanged to create alternative switch arrangements in panels or control modules.

The advantages of the present invention are particularly suitable for use in vehicles such as boats or recreational vehicles for example. Whenever an array of rocker switches must be provided for selective actuation, the advantages of reversing alternate rockers of the same general design can be appreciated.

I claim:

1. Electrical Switch Rockers for use in conjunction with side-by-side switch housings, each rocker including a molded polymeric shell for the top convex surface and depending sidewalls to afford pivotal rocker motion about an axis defined below a medial portion of the convex top surface, said rocker shell top surface defining an upwardly open cavity in said medial portion, a plurality of shell inserts of colors and/or texture contrasting with that of said top rocker surface for selective placement of a shell insert in said cavity, said inserts having oppositely curved end portion, and arranging at least some rockers in an alternate orientation to an adjacent rocker such that these shell inserts have their opposed end portions reversed to create a wave pattern of alternatively disposed rockers.

2. The combination according to claim 1 wherein each of said shell inserts has a shape dictated by parallel sides that complement the rocker side walls, said shell inserts further including arcuately shaped end walls.

3. The combination according to claim 1 further including lenses provided in openings defined for this purpose in the top surface of the rocker shell.

4. The combination according to claim 3 wherein said shell inserts define a lens opening aligned with a lens opening in said rocker shell.

5. The combination according to claim 4 wherein additional rocker inserts are provided with lens openings of different configurations from said lens openings defined in claim 4.

6. An electrical switch rocker for use in conjunction with a switch housing having an actuator supported in a central opening of a top bracket portion of the housing, said rocker including a molded polymeric shell having a convex top surface and depending side walls of sufficient depth to allow pivotal motion of the rocker about an axis in the housing that is spaced below a medial portion of the convex top surface of the rocker, said rocker shell top surface defining an upwardly open cavity in said medial portion, said cavity having arcuately curved end walls, and a plurality of shell inserts of colors and/or textures contrasting with that of said top surface, wherein said arcuately shaped end walls are convex at an end of each insert and concave at the opposite end, said rocker top surface cavity having a complementary concave and convex shape for receiving said insert for selective placement of shell insert in a cavity, said shell inserts having said arcuately shaped end walls that complement the arcuate shape of the end walls of the cavity in the rocker top surface.

* * * * *